United States Patent
Nelson et al.

[11] 3,732,489
[45] May 8, 1973

[54] TRANSFORMER PHASE ANGLE ERROR AND RATIO CORRECTION FACTOR TRANSDUCER

[75] Inventors: Jerry G. Nelson, Romulus Township, Wayne County; Alfredo Francesconi, Detroit, both of Mich.

[73] Assignee: The Detroit Edison Company, Detroit, Mich.

[22] Filed: Feb. 7, 1972

[21] Appl. No.: 223,918

[52] U.S. Cl. .................................................. 324/55
[51] Int. Cl. ............................ G01r 31/06, G01r 29/20
[58] Field of Search ........................................ 324/55

[56] References Cited

UNITED STATES PATENTS

| | | | |
|---|---|---|---|
| 2,410,386 | 10/1946 | Miller | 324/55 |
| 2,566,140 | 8/1951 | Petch | 324/55 |
| 2,666,895 | 1/1954 | Knopp | 324/55 |
| 2,911,591 | 11/1959 | Pritchett | 324/55 |

Primary Examiner—Gerard R. Strecker
Attorney—Dale R. Small

[57] ABSTRACT

An electronic circuit for and method of simultaneously providing the ratio correction factor and phase angle error for a test transformer relative to a standard transformer by continuously determining the vector components of the signal resulting from comparison of the voltage across the secondary windings of the standard transformer, the ratio correction factor and phase angle error of which are known, and a test transformer, the ratio correction factor and phase angle error of which is unknown, by sampling a plurality of single cycles of the resulting signal voltage at predetermined points in the resulting signal 90° displaced from each other at each of which one of the ratio correction factor and phase angle error provide no signal voltage and filtering the sample signals to provide direct current signals varying over time which are proportional to the ratio correction factor and phase angle error of the test transformer relative to the standard transformer.

10 Claims, 3 Drawing Figures

PATENTED MAY 8 1973    3,732,489

3,732,489

TRANSFORMER PHASE ANGLE ERROR AND RATIO CORRECTION FACTOR TRANSDUCER

BACKGROUND OF THE INVENTION

1. Field of the Invention

The invention relates to testing and measuring equipment and refers more particularly to a structure for and a method of continuously measuring the ratio correction factor and phase angle error of a transformer to be tested relative to the ratio correction factor and phase angle error of a standard transformer, which apparent ratio correction factor and phase angle error may be used to determine the true ratio correction factor and phase angle error of the test transformer.

2. Description of the Prior Art

In the past, the measurement of energy transfer in electrical transformers has often been accomplished at the voltage of the transformer primary winding which, if the voltages are great or the currents high, is dangerous to workmen. Where step-down secondary transformer windings have been used in conjunction with the primary transformer windings in the past to measure energy transfer, they have introduced a ratio error and a phase angle error into the measurement of energy transfer, since transformer secondary windings only rarely have the exact nominal transformer ratio specified by the manufacturer, and the phase angle of the voltage or current from the secondary winding of the transformer is always displaced somewhat from the phase angle of the voltage or current in the transformer primary winding. Such errors are undesirable when large energy transfers as between one public utility and another or between a public utility and a large industrial user is being considered.

Further, recently voltage reduction has been accomplished by a capacitive transfer system rather than transformer transfer systems, and it has been found that the capacitive transfer systems are sensitive to weather, atmospheric conditions, dirt, and the like, so that the development of test equipment to provide accurate estimates of the reduced voltage by the capacitive transfer systems, which in themselves are not affected by such extraneous factors and are therefore accurate, are desirable.

SUMMARY OF THE INVENTION

In accordance with the invention, structure for and a method of providing continuous ratio correction factor and phase angle error information for a test transformer relative to a standard transformer is provided.

In accordance with the structure and method of the invention, the voltage in the secondary winding of the test transformer is compared with the voltage in the secondary winding of a standard transformer, the ratio correction factor and phase angle error for which is known, with the primary winding of the standard transformer being fed with the same voltage as the primary winding of the test transformer.

In accordance with the invention, a voltage which is the resultant of the comparison of the voltages in the secondary winding of the test transformer and the standard transformer is periodically sampled to determine components thereof displaced ninety degrees from each other which are, for small phase angle errors, equal to one minus the ratio correction factor of the test transformer and the phase angle error of the test transformer relative to the standard transformer. The sample voltages are filtered to provide smooth direct current signals proportional to the relative ratio correction factor and phase angle errors which signals are continuously recorded.

The ratio correction factor and phase angle error of the test transformer can then be compared with the known ratio correction factor and phase angle error of the standard transformer to provide the true ratio correction factor and phase angle error of the test transformer.

DESCRIPTION OF THE PREFERRED EMBODIMENT

Figure 1:
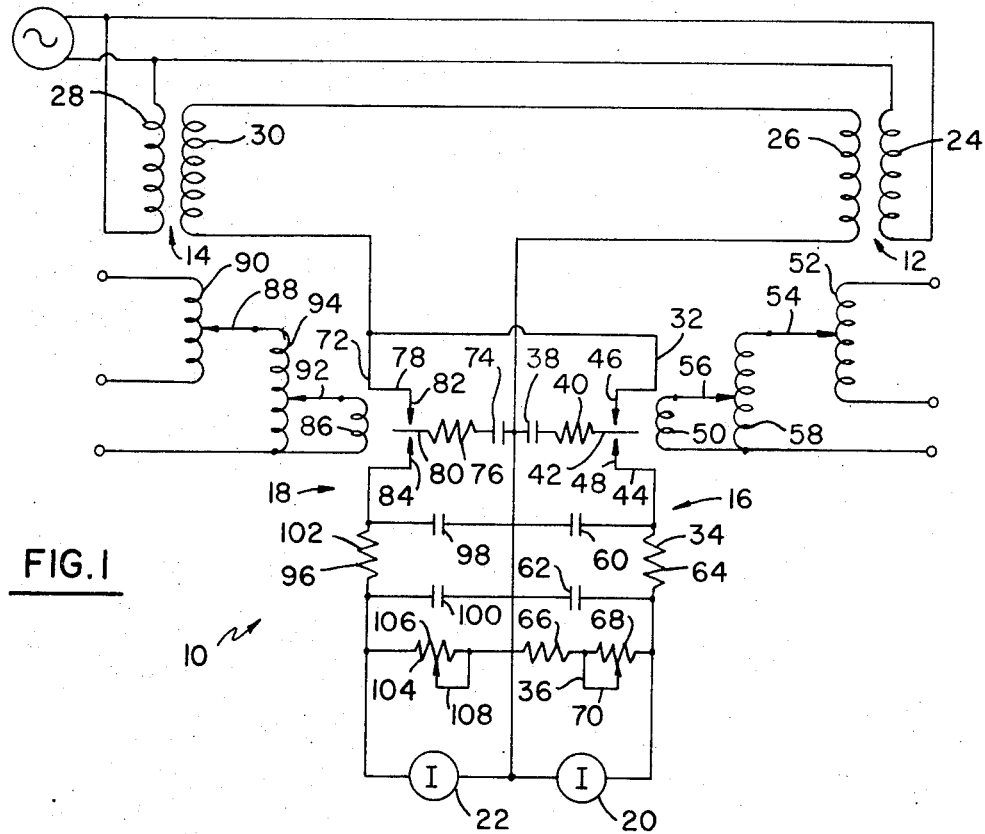
FIG. 1 is a schematic diagram of ratio correction factor and phase angle error determining structure of the invention for simultaneously providing a continuous ratio correction factor and phase angle error signal for a test transformer relative to a standard transformer in accordance with the method of the invention.

The circuit 10 shown in FIG. 1 includes a test transformer 12, a standard transformer 14, ratio correction factor transducing circuit 16, phase angle error transducing circuit 18, and recorders 20 and 22 for continuously recording the ratio correction factor and phase angle error of the test transformer 12 relative to the standard transformer 14.

The test transformer 12 includes a primary winding 24 and a secondary winding 26. The test transformer 12 is a step-down transformer having a nominal ratio of, for example, 1000 to 1. The ratio correction factor and phase angle error of transformer 12 are unknown and to be determined.

The standard transformer 14 includes the primary winding 28 and the secondary winding 30. Transformer 14 again has a nominal ratio of 1000 to 1. The ratio correction factor and phase angle error of the standard transformer 14 are known.

The ratio correction factor transducing circuit 16 as indicated includes a ratio error detector 32, the filter circuit 34 and the variable attenuation 36 connected as shown in FIG. 1. The input to the ratio correction factor transducer circuit 16 are the signals from the secondary windings 26 and 30 of the test transformer 12 and standard transformer 14, respectively, while the output of the ratio correction factor transducing circuit is a direct current signal which varies in accordance with one minus the ratio correction factor difference between the test transformer 12 and the standard transformer 14.

In particular, the ratio error detector 32 includes a capacitor 38 and a resistor 40 connected in series with the movable contact 42 of a frequency responsive vibrating switch 44. Switch 44 has the fixed contacts 46 and 48. The frequency responsive switch 44 is energized by means of a coil 50 at a frequency determined by the frequency of the signal tapped from coil 52 of a powerstat frequency source by movable arm 54 at a voltage level determined by the setting of the movable arm 56 on the powerstat coil 58. Any selectable source of electrical power for energizing the coil 50 at the required frequency and which will be considered subsequently may be substituted for the indicated powerstat equipment.

As shown, the capacitor 38, resistor 40, movable contacts 42 of the frequency responsive vibrating switch 44, and the fixed contacts 46 of the switch 44 are connected in series with the secondary windings 26 and 30 of the transformers 12 and 14 on engagement of the contacts 42 and 46 of the switch 44. At such time the capacitor 38 will be charged to a value depending on the time of engagement of the contacts 42 and 46 of the switch 44 and other obvious parameters such as the voltages on the secondary windings 26 and 30 of the transformers at the time of closing of the contacts 42 and 46, the capacity of the capacitor and the resistance of the resistor 38 and 40, respectively.

The filter circuit 34 includes the capacitors 60 and 62 and the resistor 64 connected as shown. The filter circuit 34 receives energy stored on the capacitor 38 during engagement of the contacts 42 and 46 on engagement of the contacts 42 and 48 of the vibrating switch 44. The signal output from the filter circuit 64 is a direct current signal, the voltage of which changes as the voltage of the pulses from the capacitor 38 changes, which direct current signal is continuous and smooth even though the energy input to the filter 34 is in pulses in accordance with the actuation of the switch 44 through the coil 50.

The load 36 includes the first resistor 66 and the variable resistor 68 having the movable arm 70 in conjunction therewith for selecting the load.

The recorder or meter 20 which is also a part of the circuit load will be considered in more detail subsequently. However, the recorder may be any standard voltage recorder and can be calibrated to read directly in terms of ratio correction factors differences between transformers 12 and 14. Thus, the load 36 may be set such that the recorder 20 will have a zero indication thereon when the ratio of the test transformer 12 is exactly equal to the ratio of the standard transformer 14. Any deviation of the ratios of the transformers 12 and 14 will produce a signal in the recorder 20 which will cause the recorder to indicate about a zero ratio correction factor, the difference in the ratios.

The phase angle error transducer circuit 18 is similar in all respects to the ratio correction factor transducer circuit 16. Thus, the phase angle error detector 72 includes the capacitor 74, resistor 76, frequency responsive switch 78 including the movable contact 80, the fixed contacts 82 and 84, and the actuating coil 86 which operates at a frequency determined by the movable arm 88 on the coil 90 which provides a voltage output at a selected frequency to the coil 86 depending on the setting of the movable arm 92 on the coil 94. The filter circuit 96 includes the capacitors 98 and 100 and the resistor 102, while the load circuit 104 includes the variable resistor 106 having the variable position arm 108. The indicator 22 is similar to the indicator 20 except that it is calibrated to read directly in terms of phase angle error of the test transformer 12 relative to the phase angle error of the standard transformer 14.

Figure 2:
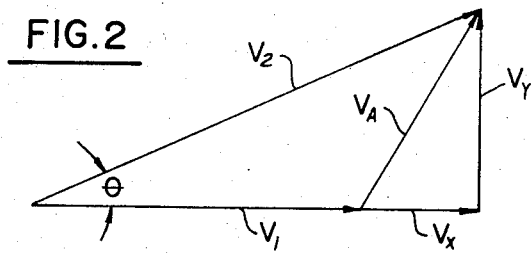
FIGS. 2 and 3 are diagrams useful in explaining the operation of the circuit of FIG. 1 in accordance with the method of the invention.

Before discussing the operation of the circuit of FIG. 1, reference is made to the diagram of FIG. 2. wherein the vector $V_1$ is the voltage from the secondary winding 30 of the standard transformer 14 having the known ratio correction factor and phase angle error. The vector $V_2$ represents the voltage in the secondary winding 26 of the test transformer 12 which has the phase angle error theta with respect to the phase angle of the voltage $V_1$. The vector voltage $V_a$ results from the combining of the two voltage $V_1$ and $V_2$ as, for example, across the resistor and capacitor 38 and 40 or the resistor, capacitor combination 76, 74. As will be understood, the resulting voltage vector $V_a$ will be a sinusoidal alternating signal with sinusoidal alternating signals applied to transformers 12 and 14, which itself will have vector components $V_x$ and $V_y$. The vector components $V_x$ and $V_y$ of the resulting signal $V_a$ are ninety degrees to each other as shown diagrammatically in FIG. 3 and for small phase angle errors as for example less than 5° are given by the formulas (1) and (2) below.

$$V_x = V_2 \cos \theta - V_1 \approx V_2 - V_1 \quad (1)$$

$$V_y = V_2 \sin \theta \approx V_2 \theta \quad (2)$$

Figure 3:
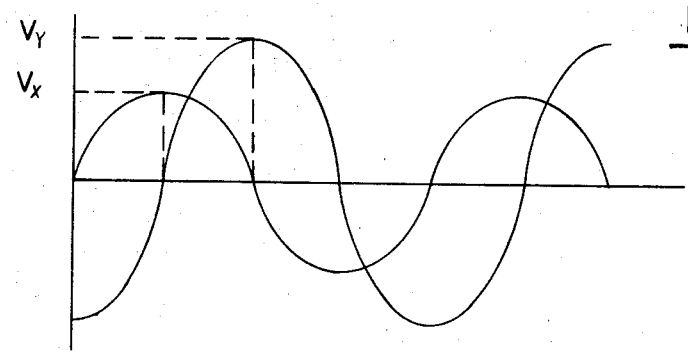

Referring particularly now to FIG. 3, it will be noted that if the $V_x$ component of the resulting voltage $V_a$ is sampled at the peak thereof, the corresponding $V_y$ voltage is zero at that time inasmuch as the $V_x$ and $V_y$ voltage components of the resulting voltage are at 90° with respect to each other. Similarly, when the voltage component $V_y$ is at a maximum, the $V_x$ component is zero.

Also, it will be noted that the $V_x$ voltage vector is proportional to the apparent ratio correction factor minus one (12 and 14) while $V_y$ is proportional to the phase angle.

Therefore, continuous sampling of the $V_x$ voltage component of the resulting voltage $V_a$ in a plurality of single cycles thereof when the $V_y$ vector is zero will provide a plurality of ratio correction factor values over time which when filtered and passed through a load will provide a direct current voltage varying as the ratio correction factor between the transformers 12 and 14 varies.

Similarly, sampling the $V_y$ voltage vector in a plurality of single cycles at a point where the $V_x$ voltage is zero, filtering the voltages sampled and passing them through a load will provide a direct current voltage which will vary as the phase angle difference between the transformers 12 and 14 varies over time.

It will be understood that such direct current signals may be run through meters or recording instruments 20 and 22 having a preselected bias and dials or recording instruments calibrated to provide a reading directly in actual ratio correction factors and phase angle errors of the transformers 12 and 14.

Thus for example, considering the ratio correction factor transducing circuit 16, the signal applied across the capacitor and resistor 38 and 40 will be $V_2 - V_1$ which may be written as formula (3).

$$V_2[1 - (V_1/V_2)] \quad (3)$$

Then, with the ratio correction factor between the transformers 12 and 14 abbreviated $RCF_1$ and $RCF_1$ being defined as $V_1/V_2$ the signal across the load resistors 66 and 68 will be given by formula (4).

$$V_2(1 - RCF_1) \quad (4)$$

Since $RCF_1$ is equal to $1 \pm a$, formula (4) may be reduced to formula (5).

$$V_2(1-1\pm a)=V_2 a \quad (5)$$

Thus, it can be readily seen that not only can the apparent ratio correction factor be directly read from the meter or recorder 20 but that if desired, the meter or recorder 20 can be provided with a division factor of $B_2$ to provide a read out of only the multiplication factor $a$.

It can be similarly shown that the relative phase angle error of the transformers 12 and 14 can be read directly from the meter or recorder 22.

Returning now to the overall operation of the circuit 10, when it is desired to measure the ratio correction factor and phase angle error of a transformer to be tested, the secondary winding of a standard transformer having a known ratio correction factor and phase angle error, and in the present instance having the same nominal ratio as the test transformer and the secondary winding 26 of the test transformer, are connected as shown. The powerstat or other frequency source is then energized to actuate the switch 44 at a frequency such that the contacts 40 and 46 thereof are engaged at the zero point of the $V_y$ voltage vector component and at the high point of the $V_x$ voltage vector component as shown in FIG. 3.

The capacitor 38 is thus charged through the resistor 40 to the value $V_x$ after which the contacts 42 and 46 are disengaged and the contacts 42 and 48 are engaged so that the energy stored on the capacitor 38 is filtered across the filter 34 and passed through the load circuit 36 to provide a direct current voltage proportional to the ratio correction factor between the transformers 12 and 14.

The contacts 42 and 46 are then again closed due to the vibratory nature of switch 44 operating at the frequency of the energy in the coil 50 due to the setting of the wiper arm 54. The wiper arm 54 is initially varied until a phase angle error variation which may be introduced between the transformers has no effect on the output of the load circuit 36 at which time the sampling of the $V_x$ voltage vector will be known to be accomplished at the zero $V_y$ voltage vector point, as desired. If preferred, more sophisticated electronic equipment can be utilized to time the operation of the sampling without initial setting of the wiper arm 54, as will be recognized by those in the art.

At the same time, a similar operation is performed with the phase angle error transducing circuit 18 and with the wiper arm 88 set to provide operation of the switch 78 ninety degrees out of phase with the operation of the switch 42 whereby only the $V_y$ vector component is measured by the circuit 18.

After the determination of the ratio correction factor between the transformers 12 and 14, the true ratio correction factor of the transformer 12 may be determined by simple algebraic manipulations. Thus, with the ratio correction factor of the standard transformer 14 given by $RCF_3$ in accordance with the formula (6), and with the true ratio correction factor of the transformer 14, $RCF_2$ given by the formula (7), it can be seen from formulas (8), (9) and (10) that $RCF_2$ is equal to $RCF_3 \times RCF_1$ as indicated in formula (11).

$$RCF_3 = (V_3/V_1)/1000 \quad (6)$$

$$RCF_2 = (V_3/V_2)/1000 \quad (7)$$

$$V_3/V_2 = (V_3/V_1)\cdot(V_1/V_2) = (V_3/V_1)\cdot RCF_1 \quad (8)$$

$$V_3/V_1 = 1000\, RCF_3 \quad (9)$$

$$\overline{RCF_2 = (V_1 RCF_1/1000) = (1000 RCF_3 \cdot RCF_1/1000)} \quad (10)$$

$$RCF_2 = RCF_3 \cdot RCF_1 \quad (11)$$

The true phase angle error for the transformer 12 can be similarly determined.

While one embodiment of the present invention has been considered in detail, it will be understood that other embodiments and modifications are contemplated by the inventor. Thus, for example, similar apparatus for current transformers is possible. It is the intention to include all the embodiments and modifications of the invention as are defined by the appended claims within the scope of the invention.

What we claim as our invention is:

1. Structure for determining at least one of the ratio correction factor and phase angle difference between the primary and secondary windings of a test transformer having primary and secondary windings relative to a standard transformer, comprising a standard transformer having a primary and secondary winding and a known ratio correction factor and phase angle error, means connected to the secondary winding of the standard transformer and the secondary winding of the test transformer for combining the signals therein to provide a resulting signal, means for periodically sampling the voltage of the resulting signal at the zero position of at least one of the vectors thereof to produce a plurality of pulses of electrical energy representative of at least one of the relative ratio correction factor and phase angle difference between the transformers at discrete times, means for receiving the pulses of electrical energy and storing them connected to the means for producing the pulses, means connected to the storing means for periodically receiving the stored pulses and filtering the stored pulses to provide a direct current signal proportional to the value of the pulsed signals over time and means for providing a direct read out of at least one of the ratio correction factor and phase angle error difference between the transformers connected to the filter means.

2. Structure as set forth in claim 1, wherein the means for providing pulses of electrical energy comprises an electric storage device and resistor in series with the secondary windings of the transformers, a switch, and means for opening and closing the switch at substantially the same time during a plurality of cycles of the energy supplied to the transformers.

3. Structure as set forth in claim 2, wherein the electrical storage device is a capacitor.

4. Structure as set forth in claim 2, wherein the switch is a vibrating switch and the means for opening and closing the switch includes a variable electric source.

5. Structure as set forth in claim 4, wherein the means for opening and closing the switch further includes means for varying the voltage of the electric source.

6. Structure for measuring both the ratio correction factor and phase angle error difference between primary and secondary windings of a test transformer relative to a standard transformer comprising a standard transformer having a primary and secondary winding with a known ratio correction factor and phase angle error between the primary and secondary windings thereof, a ratio error detector connected in series between the secondary windings of the test and standard transformers for providing a series of electric pulses proportional to the ratio correction factor at discrete times, a phase angle error detector connected in series between the secondary windings of the test and standard transformers and in parallel with the ratio error detector for providing a series of electric pulses proportional to the phase angle error at discrete times, a ratio correction factor filter connected to the ratio error detector for filtering the pulsed signals from the ratio error detector, a variable load connected across the output of the ratio error detector filter and a recorder for continuously recording directly the ratio correction factor between the transformers, a phase angle error detector filter connected to the phase angle error detector, for filtering the pulsed signals from the phase angle error detector and a variable load connected across the output of the phase angle error detector filter and a recorder for continuously recording directly the phase angle error between the transformers.

7. Structure as set forth in claim 6, wherein each of the ratio error detector and phase angle error detector comprise a capacitor, resistor and a vibrating switch connected in series with each other and in series with the secondary windings of the transformers and in parallel with each other, and variable vector drives for the vibrating switches for vibrating the vibrating switches at different substantially non-interfering phases at 90° to each other with frequencies equal to the frequency as seen by the test and standard transformers.

8. The method of determining at least one of the ratio correction factor and phase angle error of a test transformer relative to a standard transformer comprising comparing the electric signals in the secondary winding of the transformers to provide a resulting signal, sampling the voltage of at least one component of the resulting signal in a plurality of cycles at a point where the voltage of the other component of the resulting signal is substantially zero to provide a plurality of discrete voltage signals which vary over time as at least one of the ratio correction factor and phase angle error between the transformers, filtering the plurality of discrete voltage signals to provide a continuous direct current signal which varies over time as at least one of the ratio correction factor and phase angle error between the transformers and providing a continuous read out of the direct current signal in terms of at least one of the ratio correction factor and phase angle error between the transformers.

9. The method as set forth in claim 8, wherein the ratio correction factor and the phase angle error between the transformers are determined simultaneously.

10. The method as set forth in claim 8, wherein the secondary windings of the transformers are connected together in series with a storage capacitor, resistance means and a switch element and the comparing and sampling is accomplished by switching the switch element at the frequency of the signal in the transformer secondary windings.

* * * * *